Apr. 24, 1923.  1,452,927

G. W. PACKER

GATHERING REEL

Original Filed July 30, 1920

Inventor,
Glenn W. Packer,
By Clarence F. Poole, Atty.

Patented Apr. 24, 1923.

1,452,927

UNITED STATES PATENT OFFICE.

GLENN W. PACKER, OF CHICAGO, ILLINOIS, ASSIGNOR TO GOODMAN MANUFACTURING COMPANY, OF CHICAGO, ILLINOIS, A CORPORATION OF ILLINOIS.

GATHERING REEL.

Original application filed July 30, 1920, Serial No. 400,251. Divided and this application filed November 20, 1920. Serial No. 425,302.

*To all whom it may concern:*

Be it known that I, GLENN W. PACKER, a citizen of the United States, residing at Chicago, in the county of Cook and State of Illinois, have invented a Gathering Reel, of which the following is a specification.

This invention relates to gathering reels adapted to be mounted on mining locomotives and has for its principal object to provide a device of the class described that shall be simple and durable in construction, and adapted to occupy a minimum amount of space.

The present invention is a divisional application of Serial No. 400,251, filed July 30, 1920, and relates particularly to the construction of the cable reel and collector ring, associated therewith. The invention consists in the combination, construction, and arrangement of parts as will hereinafter be described in connection with the accompanying drawings, and more particularly defined in the appended claims.

Figure 1:
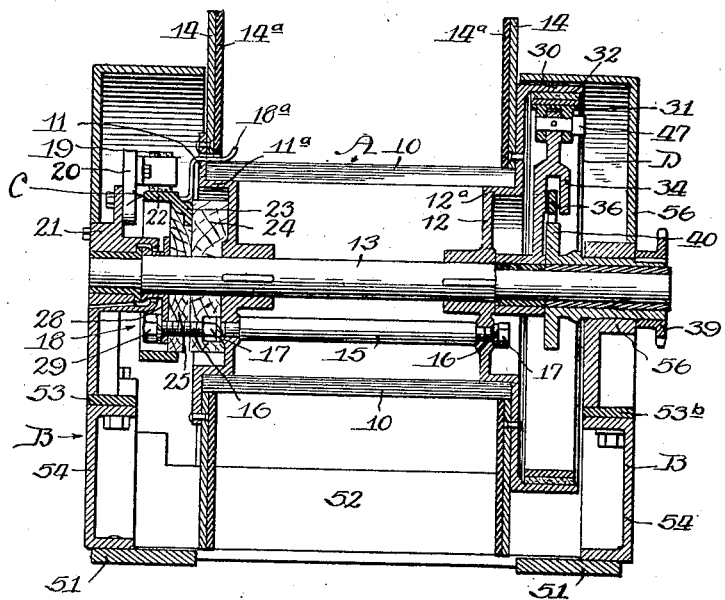
Figure 1 is a vertical longitudinal section of the gathering reel embodying my invention.
Figure 2:
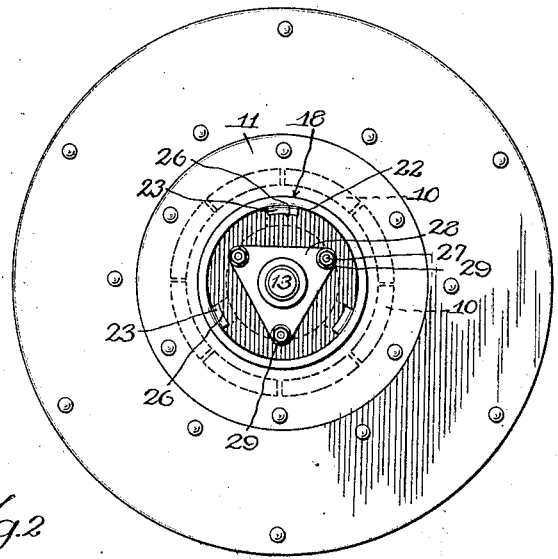
Figure 2 is a side view of the reel body showing details of the collector ring.

Referring now to details of the construction of the embodiment illustrated in the drawings, the gathering reel comprises a body portion A mounted on supports B, B and having a collector ring device C at one end, and a clutch mechanism D at the opposite end thereof. The body portion A comprises a plurality of longitudinally extending frame members 10, 10, arranged in the form of a cylinder and clamped at their ends between the end plates 11 and 12. The frame members are preferably made of wood or other non-conducting material. The end plates 11 and 12 are provided with annular shoulders $11^a$ and $12^a$, respectively, concentrically arranged with respect to the reel shaft 13. Radially extending discs 14, 14, having insulated inner surfaces $14^a$, $14^a$, are attached to the outer peripheries of the end plates 11 and 12. The frame members 10 are preferably arranged with their ends between the inner margin of the discs 14, 14 and the shoulders $11^a$ and $12^a$ of the end plates so as to be secured therebetween, as shown in Figure 1. The end plates 11 and 12 are keyed or otherwise attached to the shaft 13 and are clamped together by a plurality of longitudinal extending tie rods 15, 15, having threaded end portions 16, 16, extending thru the end plates and provided with retaining nuts 17, 17.

Gathering reels of the class herein described are usually provided with a collector ring and brush suitable for conducting the electric current from the rotating reel to the locomotive. In the present construction, the collector ring mechanism is indicated at C and comprises a ring 18 carried by and moving with the reel, and a brush 19, suitably mounted in the bracket 20 on the end bearing 21. The collector ring 18 is mounted on the reel body portion A, and comprises an annular contact portion 22, and a plurality of inwardly extending lugs 23, 23. The collector ring is seated on a suitable insulated block 24 mounted adjacent the end plate 11. A second insulating block 25 having a series of recesses 26, 26 on its under face adapted to register with the lugs 23, 23, fits inside of the collector ring and against the block 24 so as to retain the collector ring in position thereagainst. Suitable retaining means for securing the blocks 24 and 25 to the end plate 11 comprises a plurality of extensions 27, 27 on the tie rods 15, 15, which project thru the insulating blocks 24 and 25 and a retaining plate 28 carried on the shaft 13, as shown. The retaining plate and insulating blocks are secured by means of nuts 29, 29 on the threaded extensions 27, 27, as shown. An insulated conductor $18^a$ is connected at one end to the ring 22 by any suitable means, and extends through the adjacent end plate 11 to connect with the cable (not shown) which is wound on the reel.

I claim as my invention:

1. In a device of the class described, a rotatable member, a collector ring carried by said rotatable member comprising an annular contact ring and a plurality of radially extending lugs, insulating means interposed between said contact ring and said rotatable member, an annular insulating disc provided with notches on the under surface thereof adapted to register with the lugs on said ring, and means extending through said insulating disc for securing the latter to said rotatable member, 2. In a device of the class described, a reel provided with a conductor cable, a shaft for said reel, a support for said shaft adjacent one end of the reel, two end plates laterally spaced apart on said shaft, having annular shoulders concentric therewith, and flanges extending outwardly beyond said shoulders, a plurality of longitudinally disposed frame members of substantially equal length having their end portions abutting said flanges and seated on said shoulders, a collector ring carried at one end of said reel having electrical connection with said conductor cable, said collector ring comprising an annular contact ring and a plurality of radially extending lugs, insulating means interposed between said contact ring and said reel, an annular insulating disc provided with notches on the under surface thereof adapted to register with the lugs on said ring, a contact member for said collector ring mounted on said supports and securing means extending thru said end plates and said insulating disc to clamp said end plates, frame members and collector ring together as a unitary structure.

Signed at Chicago, Ill., this 18th day of November 1920.

GLENN W. PACKER.